United States Patent [19]
English et al.

[11] Patent Number: 5,521,903
[45] Date of Patent: May 28, 1996

[54] PORT SYSTEM FOR INTERFACING DIGITAL PBX TO DIGITAL TRANSMISSION FACILITY

[75] Inventors: Michael J. English, Aurora; Michel L. Hearn, Broomfield; David M. Kissel; Douglas A. Spencer, both of Boulder; Jeffrey A. Williams, Thornton; Jerome J. Zelenski, Broomfield, all of Colo.

[73] Assignee: AT&T Corp., Murray Hill, N.J.

[21] Appl. No.: 173,903

[22] Filed: Dec. 27, 1993

[51] Int. Cl.$^6$ .................................................... H04M 3/22
[52] U.S. Cl. ............................ 370/14; 370/15; 370/58.2; 379/5; 379/26; 379/165; 379/225; 371/20.5
[58] Field of Search .................................. 370/13, 14, 15, 370/53, 54, 58.1, 58.2; 379/156, 164, 165, 166, 1, 5, 6, 22, 26, 231, 234, 225; 371/20.1, 20.2, 20.3, 20.4, 20.5

[56] References Cited

U.S. PATENT DOCUMENTS

| | | | |
|---|---|---|---|
| 4,675,862 | 6/1987 | Banzi, Jr. et al. | 371/20.2 |
| 4,736,409 | 4/1988 | Hasegawa et al. | 379/166 X |
| 4,860,281 | 8/1989 | Finely et al. | 370/15 |
| 4,953,195 | 8/1990 | Ikemori | 379/26 X |
| 5,099,474 | 3/1992 | Ohtsuka et al. | 370/58.1 |
| 5,121,420 | 6/1992 | Marr et al. | 379/26 |
| 5,166,925 | 11/1992 | Ward | 370/13 X |
| 5,208,803 | 5/1993 | Conforti et al. | 370/13 |
| 5,343,461 | 8/1994 | Barton et al. | 370/13 |

*Primary Examiner*—Douglas W. Olms
*Assistant Examiner*—Russell W. Blum

[57] ABSTRACT

A port system interfaces digital PBX's to any transmission facility having DSX-1 communications ports via a microprocessor controlled PBX port board connected between PBX switch fabric and a first DSX-1 communications port. A channel service unit (CSU) module coupled directly to the port board for communications with DS1 transmission lines defines a second DSX-1 communications port which is coupled to the first DSX-1 communications port. The CSU module also includes a T1 transceiver and line interface circuitry for coupling the CSU module to a DS1 transmission line. The combination of the port board and CSU module provide full functionality of conventional CSU's while the port board alone permits direct coupling of transmission facilities utilizing a DSX-1 communications port. For remote maintenance, a microprocessor of the port board is coupled to a control processor of a PBX for control of the port board microprocessor via the PBX control processor. Wiring test circuitry is provided in the CSU module to detect faults in the wiring between a CSU module and a DS1 transmission line. The CSU module includes a transmitter transformer having a center-tapped secondary winding and a receiver transformer having a center-tapped primary winding. A current limited current source is selectively connected between the center taps of the transmitter and receiver transformers such that, when connected, one or more transformers in a CSU/DS1 interface circuit which is faulty will saturate leading to failure of transmission tests and hence proper detection of the fault.

14 Claims, 4 Drawing Sheets

PORT SYSTEM FOR INTERFACING DIGITAL PBX TO DIGITAL TRANSMISSION FACILITY

BACKGROUND OF THE INVENTION

The present invention relates in general to digital private branch exchanges (PBX's) and digital transmission facilities which interconnect to digital PBX's and, more particularly, to interface arrangements between digital PBX's and interconnected digital transmission facilities.

Originally, interface arrangements between digital PBX's and digital transmission facilities were provided by the inter-exchange carrier (IXC), for example AT&T, or local exchange company (LEC), for example Ohio Bell. Such interface arrangements can now be provided by customer premise equipment (CPE) vendors and are commonly provided external to the PBX's by functional units referred to as channel service units (CSU's).

On the transmission facility side, a CSU provides a line interface to a DS1 (digital signal level 1) transmission line using T1 signalling wherein a digital signal is transmitted at a nominal rate of 1.544 Mbits/s. On the PBX side, a CSU provides a DSX-1 (digital cross-connect signal) communications port.

The CSU also provides framing circuitry such that digital information can be provided in proper framing format for both the transmission facility and the PBX. The framing circuitry provides transcoding of framing from a Superframe or D4 format to an Extended Superframe (ESF) format; from D4 to D4; from ESF to D4; and, from ESF to ESF such that any variety of PBX is able to communicate with any variety of digital transmission facility.

The CSU also is used to perform maintenance operations for the transmission facility and the PBX. For example, loopback functions and test signals are provided from the CSU. Further, status lamps or light emitting diodes (LED's) and service jacks for gaining access to signals to and from the transmission facility and the PBX are also provided on the CSU.

Unfortunately, normally maintenance procedures require manual intervention at the CSU which requires dispatching a technician to the PBX with attendant costs. While the CSU can be equipped with a network management port which can be remotely accessed for maintenance purposes, such remote maintenance arrangements are expensive, require ESF data link handling which is not integrated with the PBX functions and, accordingly, are not widely used.

There is, thus, a need for an improved port system for interfacing digital PBX's to digital transmission facilities. Preferably, the improved port system would be backward compatible with existing digital PBX switches, could be used to replace existing port systems at reduced cost and would interface digital PBX's to any transmission facility having a DSX-1 communications port and/or to DS1 transmission lines providing all functionality of CSU's. In addition, the improved port system would provide maintenance features which can be remotely accessed as an extension of the PBX into which it is integrated.

SUMMARY OF THE INVENTION

This need is met by the invention of the present application wherein a port system provides for interfacing a digital PBX to any transmission facility having a DSX-1 communications port by means of a microprocessor controlled PBX port board which connects between switch fabric of the PBX and a first DSX-1 communications port. Accordingly, any transmission facility having a DSX-1 communications port can be interfaced to the PBX via the port board. If DS1 transmission lines are to be used to service the PBX, a channel service unit (CSU) module is coupled directly to the port board.

The CSU module defines a second DSX-1 communications port which is connected to the first DSX-1 communications port of the port board. The CSU module also includes a T1 transceiver and line interface circuitry for coupling the CSU module to a DS1 transmission line. The combination of the port board and CSU module of the present application provides the full functionality of conventional CSU's. The port board alone permits direct coupling of transmission facilities utilizing a DSX-1 communications port.

The microprocessor of the port board is coupled to a control processor of the PBX which the port board services for control of the port board microprocessor via the PBX control processor. In this way, remote maintenance capabilities of the PBX can be used to access and remotely perform maintenance, testing, performance monitoring and like functions via the PBX. The port board thus moves the signal conditioning, maintenance, testing, performance monitoring and like functions into the PBX rather than having these functions in a separate CSU, as currently provided. In this way, most problems which required a technician to travel to the PBX can be cleared diagnosed to eliminate the costs associated with such service calls.

Another common problem encountered with current CSU's is the misconnection, breakage or failure of the wiring extending between a CSU and a DS1 transmission line. A misconnection may be caused by slipping the connection of one pair of transmission wires by one connection point such that only one wire interconnects a two-wire connection. Such connections will often pass transmission tests since sufficient coupling is provided to marginally satisfy test requirements. In the CSU module of the present application, wiring test circuitry is provided to detect such misconnections and other wiring faults not reliably detectable by present stress pattern testing methods.

DS1 transmission line interface circuitry in the CSU module includes a transmitter transformer having a center-tapped secondary winding and a receiver transformer having a center-tapped primary winding. A current limited current source is selectively connected between the center taps of the transmitter and receiver transformers such that, when connected, one or more transformers in a CSU/DS1 interface circuit which is misconnected or faulty will saturate leading to failure of transmission tests and hence proper detection of the misconnection or fault.

In accordance with one aspect of the present invention, a port system for interfacing a digital PBX to a digital transmission facility comprises a switch fabric interface circuit connectable to the switch fabric of a digital PBX system and a first DSX-1 transceiver circuit defining a first DSX-1 communications port. A framer circuit is connected between the switch fabric interface circuit and the DSX-1 transceiver circuit for transcoding framing therebetween. A microprocessor is provided for controlling the switch fabric interface circuit, the DSX-1 transceiver circuit and the framer circuit to transmit properly framed data from the PBX switch fabric to the first DSX-1 communications port and to transmit properly framed data from the first DSX-1 communications port to the PBX switch fabric.

The port system further comprises a system control interface for coupling the microprocessor to a control processor of the digital PBX for control of the microprocessor via the PBX control processor. For connection of the PBX with a DS1 transmission line, the port system further comprises a channel service unit data link coupled to the microprocessor and a channel service unit module. The channel service unit module comprises a T1 transceiver and line interface circuitry for coupling the T1 transceiver to a DS1 transmission line. A second DSX-1 transceiver circuit defines a second DSX-1 communications port for connecting the T1 transceiver to the framer circuit through the first DSX-1 port. Channel service unit module control circuitry connected to the microprocessor via the channel service unit data link and coupled to the T1 transceiver and the second DSX-1 transceiver provides for controlling operation of the T1 transceiver and the second DSX-1 transceiver.

The channel service unit module control circuitry preferably comprises default circuitry for setting default values for parameters used to control operation of the port system. The PBX processor is connected to maintenance circuitry for local and remote setting of the control parameters and maintenance of the PBX, the port system and connected digital transmission facilities.

In accordance with another aspect of the present invention, a channel service unit module for interfacing a first DSX-1 communications port from a digital PBX to a digital transmission facility comprises a T1 transceiver and line interface circuitry for coupling the T1 transceiver to a DS1 transmission line. A DSX-1 transceiver circuit defines a second DSX-1 communications port for connecting the T1 transceiver to the first DSX-1 port. Channel service unit module control circuitry provides for operation of the T1 transceiver and the second DSX-1 transceiver.

In accordance with yet another aspect of the present invention, an integrated channel service unit for interfacing a digital PBX to a digital DS1 transmission facility comprises a port circuit and a channel service unit module. The port circuit comprises a switch fabric interface circuit connectable to the switch fabric of a digital PBX system. A first DSX-1 transceiver circuit defines a first DSX-1 communications port. A framer circuit is connected between the switch fabric interface circuit and the DSX-1 transceiver circuit for transcoding framing therebetween. A microprocessor is provided for controlling the switch fabric interface circuit, the DSX-1 transceiver circuit and the framer circuit to transmit properly framed data from the PBX switch fabric to the first DSX-1 communications port and to transmit properly framed data from the first DSX-1 communications port to the PBX switch fabric. A system control interface couples the microprocessor to a control processor of the digital PBX for control of the microprocessor via the PBX control processor. A channel service unit data link is coupled to the microprocessor. The channel service unit module comprises a T1 transceiver and line interface circuitry for coupling the T1 transceiver to the DS1 transmission facility. A second DSX-1 transceiver circuit defines a second DSX-1 communications port for connecting the T1 transceiver to the framer circuit through the first DSX-1 port. Channel service unit module control circuitry connected to the microprocessor via the channel service unit data link and coupled to the T1 transceiver and the second DSX-1 transceiver provides for controlling operation of the T1 transceiver and the second DSX-1 transceiver.

For maintenance purposes, the second DSX-1 transceiver circuit includes equipment loopback circuitry for selectively defining a loopback to the digital PBX, the line interface circuitry includes line loopback circuitry for defining a passive loopback to the DS1 transmission line and the T1 transceiver includes line loopback circuitry for selectively defining repeater and line loopbacks to the DS1 transmission line. For detecting wiring faults, the line interface circuitry comprises wiring test circuitry for detecting discontinuities in wiring extending from the line interface circuitry toward the DS1 transmission line. In the illustrated embodiment, the line interface circuitry comprises a transmitter transformer having a center-tapped secondary winding and a receiver transformer having a center-tapped primary winding. For this embodiment, the wiring test circuitry comprises a current limited current source and at least one switch for selectively connecting the current limited current source between the center tap of the transmitter transformer and the center tap of the receiver transformer.

It is, thus, an object of the present invention to provide an improved port system for interfacing digital PBX's to digital transmission facilities; to provide an improved port system for interfacing digital PBX's to digital transmission facilities via a microprocessor controlled PBX port board which connects between switch fabric of the PBX and a first DSX-1 communications port; to provide an improved port system for interfacing digital PBX's to digital transmission facilities via a microprocessor controlled PBX port board which connects between switch fabric of the PBX and a first DSX-1 communications port to which is coupled a channel service unit (CSU) module for interfacing the PBX to a DS1 transmission line; and, to provide an improved port system for interfacing digital PBX's to digital transmission facilities which can detect wiring faults to a DS1 transmission line.

Other objects and advantages of the invention will be apparent from the following description, the accompanying drawings and the appended claims.

DETAILED DESCRIPTION OF THE INVENTION

Figure 1:
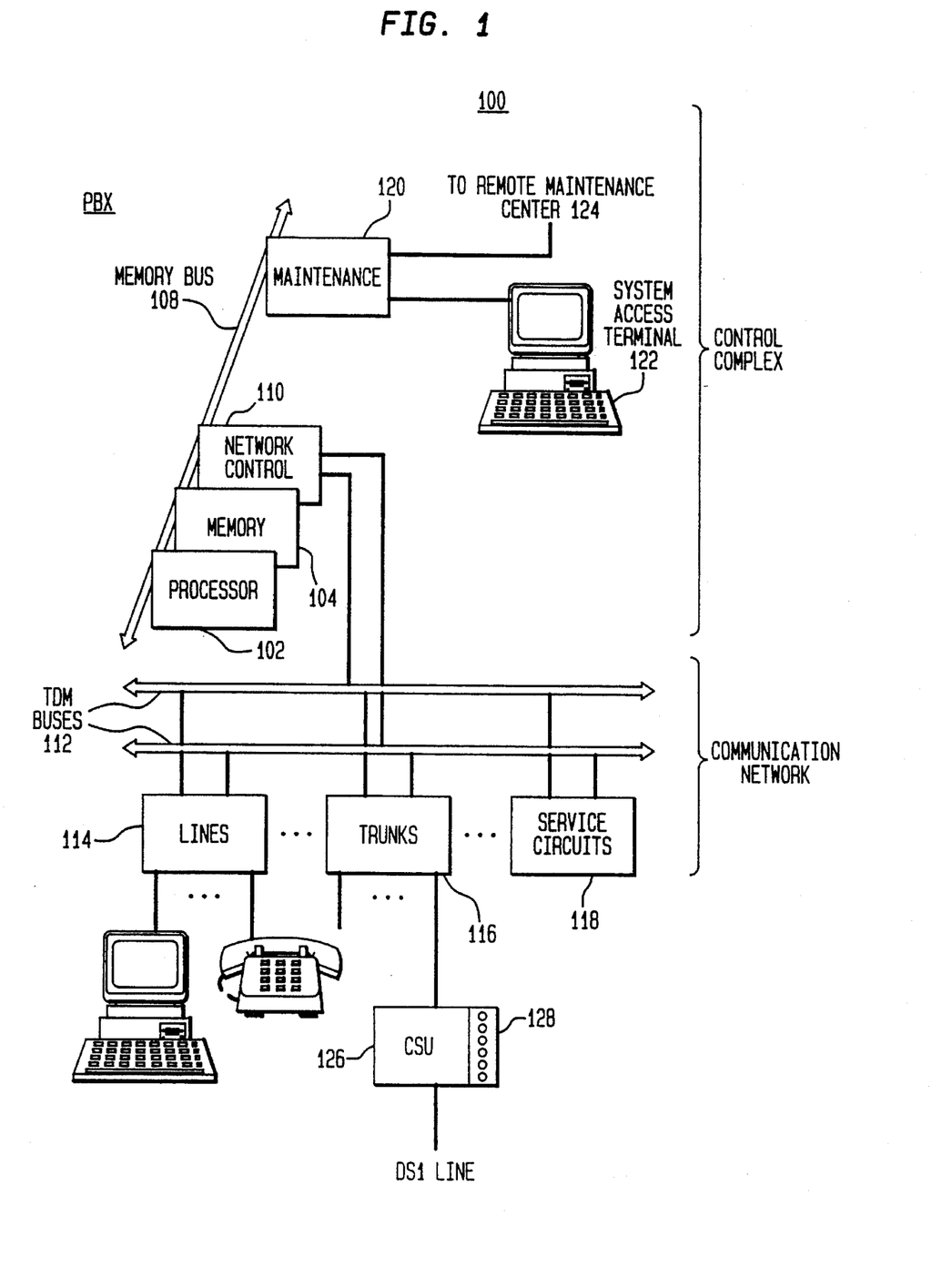
FIG. 1 is a schematic block diagram of a digital private branch exchange (PBX) representative of PBX's in which the port system of the present invention can be utilized to advantage.

The invention of the present application will now be described with reference to the drawing figures wherein FIG. 1 illustrates a digital private branch exchange (PBX) 100. The PBX 100 includes a control processor 102 which is associated with a memory 104 which includes both active and backup memory elements via memory bus 108. The control processor 102 controls the PBX switch fabric via a network control 110 with the switch fabric comprising time division multiplex (TDM) buses 112.

Line circuits 114, trunk circuits 116 and service circuits 118 are connected to the TDM buses 112 for performing conventional functions associated with PBX switching operations. A maintenance circuit 120 connected to the memory bus 108 is accessed by a system access terminal 122 and/or by a remote maintenance center 124 directly or via a dial-up port connected through the PBX 100.

Currently, interfacing between a digital PBX, such as the PBX 100, and a DS1 transmission line is performed by a channel service unit (CSU) 126. On the transmission facility side, the CSU 126 provides a line interface to a DS1 (digital signal level 1) transmission line using T1 signalling wherein a digital signal is transmitted at a nominal rate of 1.544 Mbits/s. On the PBX side, the CSU 126 provides a DSX-1 (digital cross-connect signal) communications port. Both of these signaling arrangements are well documented and known in the telephony art. Other well known signaling arrangements similar to the above noted signaling arrangements can be employed for interfacing international digital facilities operating at a nominal rate of 2.048 Mbits/s.

The CSU 126 also is used to perform maintenance operations for the DS1 transmission line and the PBX 100. For example, loopback functions and test signals are provided from the CSU 126. Further, status lamps or light emitting diodes (LED's) and service jacks 128 for gaining access to signals to and from the DS1 transmission line and the PBX 100 are also provided on the CSU 126.

Unfortunately, normally maintenance procedures performed via the CSU 126 require manual intervention at the CSU 126 such that a technician must be dispatched to the PBX 100 with attendant costs. While the CSU 126 can be equipped with a network management port (not shown) which can be remotely accessed for maintenance purposes, such remote maintenance arrangements are expensive, require ESF data link handling which is not integrated with the PBX functions and, accordingly, are not widely used.

Further, CSU's are expensive, consume space separate from port boards which they service in a PBX, require power separate from the port boards, and, since they are separate from the port boards to which they are connected, may be incorrectly identified with the port boards leading to interrupted messages during diagnostic operations.

Figure 2:
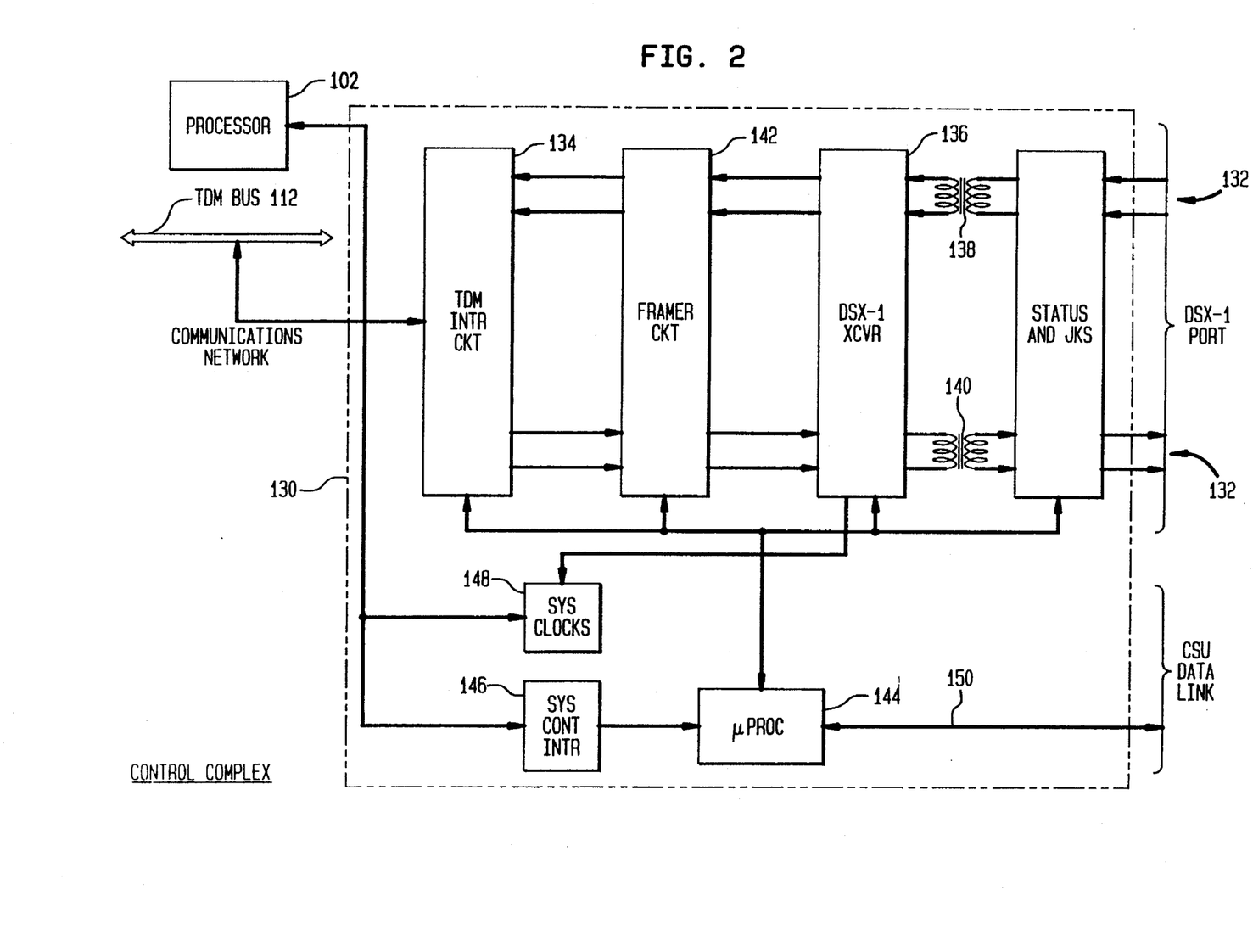
FIG. 2 is a schematic block diagram of a port board of the port system of the present invention showing its connections within a PBX.

To overcome the interface arrangement problems of the prior art, the port system of the present invention provides a port board 130 which connects between the switch fabric or TDM buses 112 of the PBX 100 and a first DSX-1 communications port 132. The port board 130 comprises a switch fabric interface circuit 134 which connects to the switch fabric or TDM buses 112 of the digital PBX 100 and a first DSX-1 transceiver circuit which, through a receiver transformer 138 and a transmitter transformer 140, defines the first DSX-1 communications port 132.

A framer circuit 142 connected between the switch fabric interface circuit 134 and the DSX-1 transceiver circuit 136 provides for transcoding framing therebetween. The framer circuit 142 transcodes framing from a framing format internal to the PBX to either Superframe (D4) format or Extended Superframe (ESF) format such that whatever the framing of the PBX 100 and DS1 transmission line, the two are able to communicate with one another.

A microprocessor 144 controls the switch fabric interface circuit 134, the DSX-1 transceiver circuit 136 and the framer circuit 142 to transmit properly framed data from the PBX 100 switch fabric or one of the TDM buses 112 to the first DSX-1 communications port 132 and to transmit properly framed data from the first DSX-1 communications port 132 to the PBX switch fabric or one of the TDM buses 112.

A system control interface circuit 146 couples the microprocessor 144 to the control processor 108 of the digital PBX 100 for control of the microprocessor 144 via the PBX 100 control processor 102. A system clock circuit 148 derives clock signals for the port board 130 from signals received directly from the control processor 102 of the PBX 100 or over the PBX switch fabric via TDM signalling and/or from the digital information stream received at the DSX-1 port 132.

Figure 4:
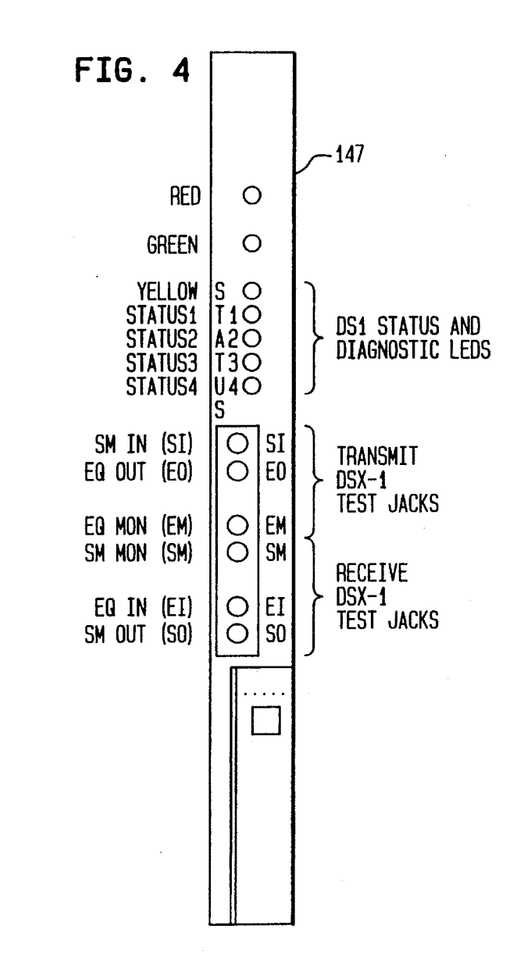
FIG. 4 is a plan view of a face plate of the port board of FIG. 2.

As shown in FIG. 4, the port board 130 also includes a face plate 147 which includes status light emitting diodes (LED's) and service jacks which can be used for local maintenance substantially the same as the status lamps or LED's and service jacks 128 of the CSU 126. In addition, status lamps or LED's can be used to indicate faulty CSU hardware functions.

Figure 3:
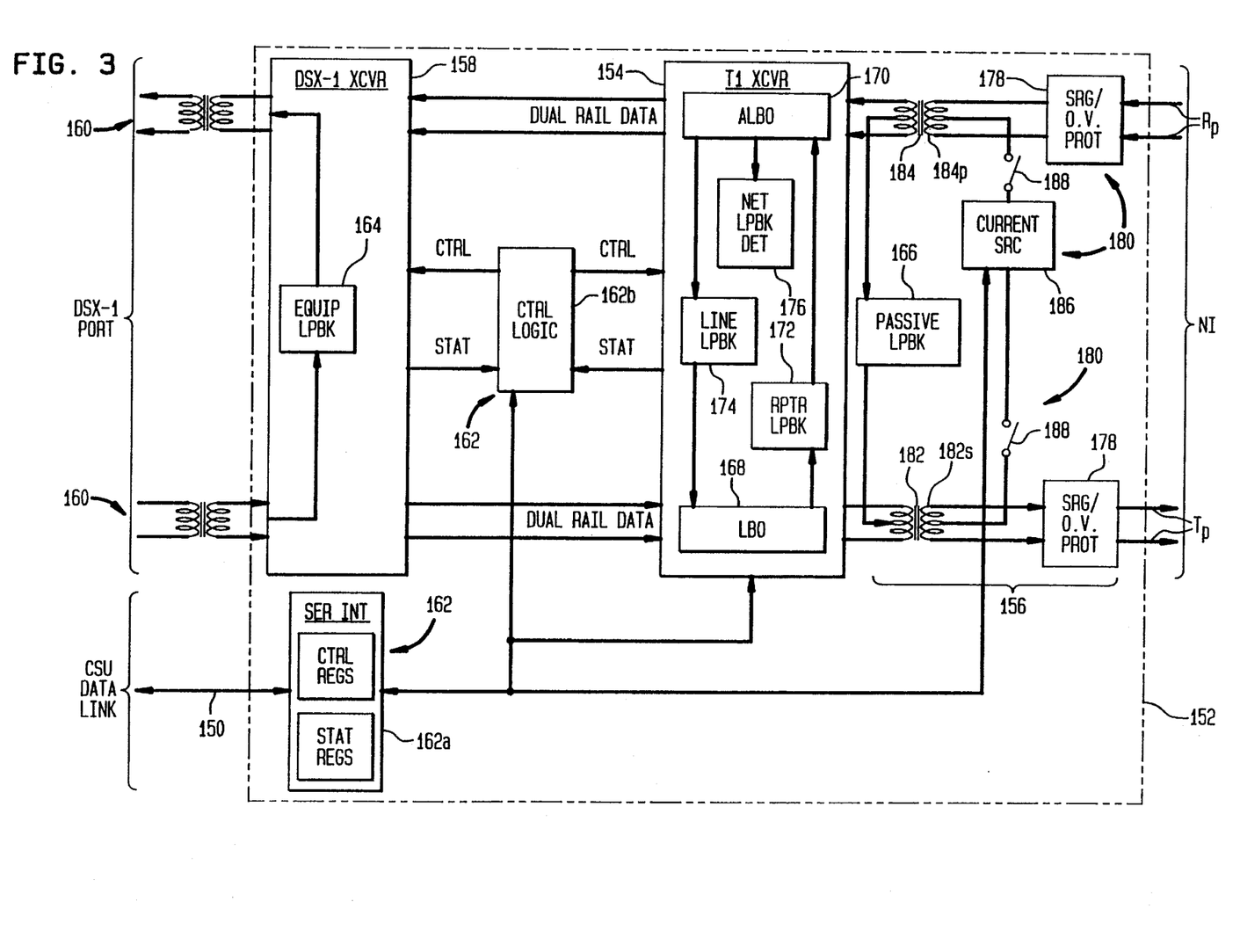
FIG. 3 is a schematic block diagram of a channel service unit (CSU) module of the port system of the present invention.

A channel service unit (CSU) data link 150 is coupled to the microprocessor 144 for control of a channel service unit (CSU) module 152 of the port system of the present invention as shown in FIG. 3. The channel service unit (CSU) module 152 comprises a T1 transceiver 154 and line interface circuitry 156 for coupling the T1 transceiver 154 to a DS1 transmission line either directly or through a network interface (NI) circuit such as a "smart jack" circuit or the like. A second DSX-1 transceiver circuit 158 defines a second DSX-1 communications port 160 for connecting the T1 transceiver 154 to the framer circuit 142 through the first DSX-1 port 132 of the port board 130.

Channel service unit (CSU) module control circuitry 162 is connected to the microprocessor 144 via the channel service unit data link 150 and coupled to the T1 transceiver 154 and the second DSX-1 transceiver 158 for controlling their operations. In particular, the CSU module control circuitry 162 comprises a serial interface 162a which includes control registers and status registers for interchange of information with the microprocessor 144, and control logic 162b which interacts with the serial interface 162a to control the T1 transceiver 154 and the second DSX-1 transceiver 158.

The second DSX-1 transceiver circuit 158 includes equipment loopback circuitry 164 for selectively defining a loopback to the digital PBX 100. The line interface circuitry 156 includes line loopback circuitry 166 for defining a passive loopback to a DS1 transmission line through a network interface (NI) circuit such as a "smart jack" circuit or the like.

The T1 transceiver 154 provides transmit line build out (LBO) 168 to reduce the level of the signal transmitted by the CSU module 152 to compensate for short distances between the CSU module 152 and the first DS1 transmission line repeater. The T1 transceiver 154 also provides automatic line buildout (ALBO) 170 to automatically adjust the gain for receiving signals from the DS1 transmission line to compensate for loss in the cable between the T1 transceiver 154 and the last DS1 repeater. The T1 transceiver 154 also provides repeater loopback 172 and line loopback 174 and network loopback capabilities 176. These transmission and testing facilities are well documented and well known in the art of telephony and will not be described herein.

The line interface circuitry 156 includes secondary surge and over voltage protection circuitry 178 to protect the CSU module 152. The line interface circuitry 156 also includes wiring test circuitry 180 for detecting discontinuities in wiring extending from the line interface circuitry 156 toward the DS1 transmission line.

In the illustrated embodiment of the invention, the line interface circuitry 156 comprises a transmitter transformer 182 having a center-tapped secondary winding 182s and a receiver transformer 184 having a center-tapped primary winding 184p. The wiring test circuitry then comprises a current limited current source 186 and switches 188 for selectively connecting the current limited current source 186 between the center tap of the transmitter transformer 182 and the center tap of the receiver transformer 184.

Figure 5:
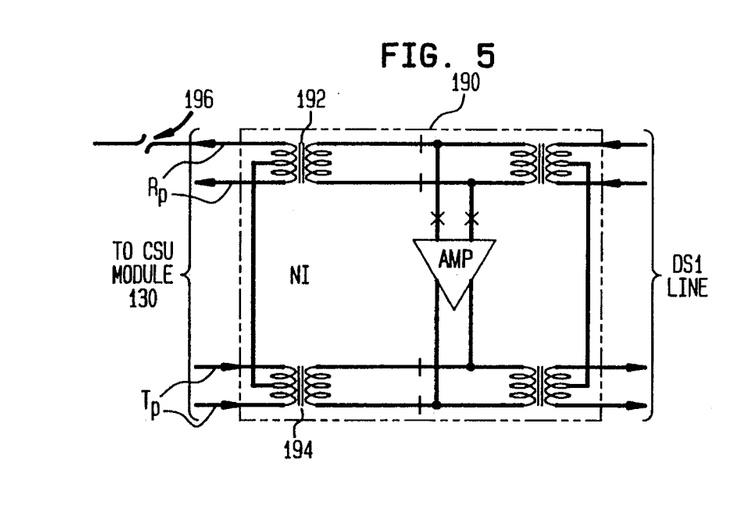
FIG. 5 is a schematic diagram of an illustrative network interface circuit.

A network interface (NI) 190 such as a "smart jack" circuit or the like as shown in FIG. 5 is connected to the interface circuitry 156. For proper connection of the wiring between the interface circuit 156 and the NI 190, when the current source 186 is connected to the interface circuit 156 by the switches 188, a simplex current path is defined by the transmit and receive wire pairs $T_p$ and $R_p$ of FIGS. 3 and 5 such that dc current from the current source 186 in the transformers 182, 184, 192 and 194 is balanced and cancels so that the transformers 182, 184, 192 and 194 can properly handle signals. However, if there is a fault or break 196 in the wiring, the currents will not be balanced leading to saturation of one or more of the transformers 182, 184, 192 and 194 and resultant blockage or corruption of test signals.

Figure 6:
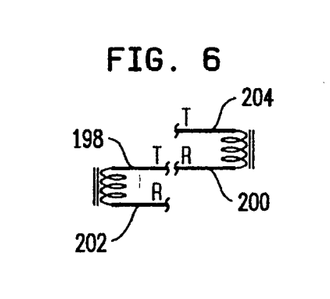
FIG. 6 illustrates a common misconnection which can be detected by the port system of the present invention.

Accordingly, if a fault is present when the current source 186 is connected by the switches 188 and test signals are applied, the test signals will be blocked at one of the transformers 182, 184, 192 and 194 and the test will fail. One common cause of such faults is the misconnection of a pair of wires such that a tip (T) 198 of one pair is connected to a ring (R) 200; and of another pair with the remaining ring (R) 202 and tip (T) 204 being left open. Such misconnections as well as other wiring faults are detected in accordance with the wiring test aspect of the present invention.

As disclosed herein, a port system in accordance with the present invention interfaces the digital PBX 100 to any transmission facility having a DSX-1 communications port by means of the microprocessor controlled port board 130 which connects between switch fabric of the PBX 100 and a first DSX-1 communications port 132. Thus, any transmission facility having a DSX-1 communications port can be interfaced to the PBX 100 via the port board 130. For example, optical, infrared and microwave DSX-1 compatible systems can be connected to the PBX 100 by means of the port board 130.

If DS1 transmission lines are to be connected to the PBX 100, the channel service unit (CSU) module 152 is coupled directly to the port board 130. The CSU module 152 defines the second DSX-1 communications port 160 which is connected to the first DSX-1 communications port 132 of the port board 130. The CSU module 152 also includes the T1 transceiver 154 and the line interface circuitry 156 for coupling the CSU module 152 to a DS1 transmission line. The combination of the port board 130 and CSU module 152 of the present application provide the required functionality of conventional CSU's, such as the CSU 126 while the port board 130 alone permits direct coupling of transmission facilities utilizing a DSX-1 communications port.

The port system of the present application also provides an inexpensive replacement for conventional CSU's and can operate with existing PBX systems which do not include software functions to optionally administer operating parameters such as ALBO, LBO, etc., provided default parameters can be used for a given interface to a DS1 transmission line. Included among the default parameters provided are: receive ALBO gain=26 dB; fixed transmit LBO at 0 dB; and, inband loopback detector enabled. These default values as well as any other defaults required for a given implementation of the present invention will be apparent to those skilled in the telephony art. In the illustrated embodiment of the present invention, the default values are provided in the control registers of the serial interface 162a; however, they can be provided in the microprocessor 144 or elsewhere in accordance with a given design.

The port board 130 and CSU module 152 are preferably mounted adjacent to one another with the port board 130 being applied within a port board mounting cage and the CSU module 152 being applied via an associated cable and connector which is mounted to the port board mounting cage. This arrangement provides a compact and inexpensive mounting arrangement which simplifies installation and also clearly associates each CSU module 152 with the port board 130 to which it is connected such that mismatches and resulting service interruptions are avoided during maintenance procedures.

Having thus described the invention of the present application in detail and by reference to preferred embodiments thereof, it will be apparent that modifications and variations are possible without departing from the scope of the invention defined in the appended claims.

What is claimed is:

1. A port system for interfacing a digital PBX including a PBX control processor to a digital transmission facility, said port system comprising:

a port board comprising:
  a switch fabric interface circuit connected to the switch fabric of a digital PBX system;
  a first DSX-1 transceiver circuit defining a first DSX-1 communications port for communication with a digital transmission facility via a second DSX-1 communications port;
  a framer circuit connected between said switch fabric interface circuit and said first DSX-1 transceiver circuit for transcoding framing therebetween;
  a microprocessor for controlling said switch fabric interface circuit, said first DSX-1 transceiver circuit and said framer circuit to transmit properly framed data from said PBX switch fabric to said first DSX-1 communications port and to transmit properly framed data from said first DSX-1 communications port to said PBX switch fabric via said switch fabric interface circuit, said first DSX-1 transceiver circuit and said framer circuit; and
  a channel service unit data link coupled to said microprocessor;
 a system control interface for coupling said microprocessor to said control processor of said digital PBX for control of said microprocessor via said PBX control processor; and
 a channel service unit module comprising:
  a T1 transceiver;
  line interface circuitry for coupling said T1 transceiver to a DS1 transmission line;
  a second DSX-1 transceiver circuit defining said second DSX-1 communications port for connecting said T1 transceiver to said framer circuit through said first DSX-1 port; and
  channel service unit module control circuitry connected to said microprocessor via said channel service unit data link and coupled to said T1 transceiver and said second DSX-1 transceiver for controlling operation of said T1 transceiver and said second DSX-1 transceiver by means of said PBX control processor via said microprocessor.

2. A port system for interfacing a digital PBX to a digital transmission facility as claimed in claim 1 wherein said channel service unit module control circuitry comprises default circuitry for setting default values for control parameters used to control operation of said port system.

3. A port system for interfacing a digital PBX to a digital transmission facility as claimed in claim 2 wherein said PBX processor is connected to maintenance circuitry for local and remote setting of said control parameters and maintenance of said PBX, said port system and said digital transmission facility.

4. A port system for interfacing a digital PBX to a digital transmission facility as claimed in claim 1 wherein said second DSX-1 transceiver circuit includes equipment loopback circuitry for selectively defining a loopback to said digital PBX.

5. A port system for interfacing a digital PBX to a digital transmission facility as claimed in claim 4 wherein said line interface circuitry includes line loopback circuitry for defining a passive loopback to said DS1 transmission line.

6. A port system for interfacing a digital PBX to a digital transmission facility as claimed in claim 5 wherein said T1 transceiver includes line loopback circuitry for selectively defining repeater and line loopbacks to said DS1 transmission line.

7. A port system for interfacing a digital PBX to a digital transmission facility, said port system comprising:
   a switch fabric interface circuit connected to the switch fabric of a digital PBX system;
   a first DSX-1 transceiver circuit defining a first DSX-1 communications port for communication with a digital transmission facility via a second DSX-1 communications port;
   a framer circuit connected between said switch fabric interface circuit and said DSX-1 transceiver circuit for transcoding framing therebetween;
   a microprocessor for controlling said switch fabric interface circuit, said DSX-1 transceiver circuit and said framer circuit to transmit properly framed data from said PBX switch fabric to said first DSX-1 communications port and to transmit properly framed data from said first DSX-1 communications port to said PBX switch fabric via said switch fabric interface circuit, said DSX-1 transceiver circuit and said framer circuit;
   a channel service unit data link coupled to said microprocessor; and
   a channel service unit module comprising:
      a T1 transceiver;
      line interface circuitry for coupling said T1 transceiver to a DS1 transmission line, said line interface circuitry comprising a transmitter transformer having a center-tapped secondary winding extending toward said DS1 transmission line and a receiver transformer having a center-tapped primary winding extending toward said DS1 transmission line, and wiring test circuitry for detecting discontinuities in wiring extending from said line interface circuitry toward said DS1 transmission line, said wiring test circuitry comprising a current limited current source and at least one switch for selectively connecting said current limited current source between said center tap of said transmitter and said center tap of said receiver transformer.

8. A channel service unit module for interfacing a first DSX-1 communications port from a digital PBX to a digital transmission facility comprising:
   a T1 transceiver;
   line interface circuitry for coupling said T1 transceiver to a DS1 transmission line of the digital transmission facility, said line interface circuitry comprising a transmitter transformer having a center-tapped secondary winding extending toward said DS1 transmission line, a receiver transformer having a center-tapped primary winding extending toward said DS1 transmission line and wiring test circuitry for detecting discontinuities in wiring extending from said line interface circuitry toward said DS1 transmission line, said wiring test circuitry comprising a current limited current source and at least one switch for selectively connecting said current limited current source between said center tap of said transmitter transformer and said center tap of said receiver transformer;
   a DSX-1 transceiver circuit defining a second DSX-1 communications port for connecting said T1 transceiver to said first DSX-1 port; and
   channel service unit module control circuitry for controlling operation of said T1 transceiver and said second DSX-1 transceiver.

9. An integrated channel service unit for interfacing a digital PBX to a digital DS1 transmission facility, said integrated channel service unit comprising:
   a port circuit comprising:
      a switch fabric interface circuit connectable to the switch fabric of a digital PBX system;
      a first DSX-1 transceiver circuit defining a first DSX-1 communications port;
      a framer circuit connected between said switch fabric interface circuit and said DSX-1 transceiver circuit for transcoding framing therebetween;
      a microprocessor for controlling said switch fabric interface circuit, said DSX-1 transceiver circuit and said framer circuit to transmit properly framed data from said PBX switch fabric to said first DSX-1 communications port and to transmit properly framed data from said first DSX-1 communications port to said PBX switch fabric via said switch fabric interface circuit, said DSX-1 transceiver circuit and said framer circuit;
      a system control interface for coupling said microprocessor to a control processor of said digital PBX for control of said microprocessor via said PBX control processor; and
      a channel service unit data link coupled to said microprocessor; and
   a channel service unit module comprising:
      a T1 transceiver;
      line interface circuitry for coupling said T1 transceiver to said DS1 transmission facility;
      a second DSX-1 transceiver circuit defining a second DSX-1 communications port for connecting said T1 transceiver to said framer circuit through said first DSX-1 port; and
      channel service unit module control circuitry connected to said microprocessor via said channel service unit data link and coupled to said T1 transceiver and said second DSX-1 transceiver for controlling operation of said T1 transceiver and said second DSX-1 transceiver by means of said PBX control processor via said microprocessor.

10. An integrated channel service unit for interfacing a digital PBX to a digital DS1 transmission facility as claimed in claim 9 wherein said second DSX-1 transceiver circuit includes equipment loopback circuitry for selectively defining a loopback to said digital PBX.

11. An integrated channel service unit for interfacing a digital PBX to a digital DS1 transmission facility as claimed in claim 10 wherein said line interface circuitry includes line loopback circuitry for defining a passive loopback to said DS1 transmission line.

12. An integrated channel service unit for interfacing a digital PBX to a digital DS1 transmission facility as claimed in claim 11 wherein said T1 transceiver includes line loopback circuitry for selectively defining repeater and line loopbacks to said DS1 transmission line.

13. An integrated channel service unit for interfacing a digital PBX to a digital DS1 transmission facility, said integrated channel service unit comprising:

a port circuit comprising:
  a switch fabric interface circuit connectable to the switch fabric of a digital PBX system;
  a first DSX-1 transceiver circuit defining a first DSX-1 communications port;
  a framer circuit connected between said switch fabric interface circuit and said DSX-1 transceiver circuit for transcoding framing therebetween;
  a microprocessor for controlling said switch fabric interface circuit, said DSX-1 transceiver circuit and said framer circuit to transmit properly framed data from said PBX switch fabric to said first DSX-1 communications port and to transmit properly framed data from said first DSX-1 communications port to said PBX switch fabric via said switch fabric interface circuit, said DSX-1 transceiver circuit and said framer circuit;
  a system control interface for coupling said microprocessor to a control processor of said digital PBX for control of said microprocessor via said PBX control processor; and
  a channel service unit data link coupled to said microprocessor; and a channel service unit module comprising:
  a T1 transceiver;
  line interface circuitry for coupling said T1 transceiver to said DS1 transmission facility, said line interface circuitry comprising wiring test circuitry for detecting discontinuities in wiring extending from said line interface circuitry toward said DS1 transmission line;
  a second DSX-1 transceiver circuit defining a second DSX-1 communications port for connecting said T1 transceiver to said framer circuit through said first DSX-1 port; and
  channel service unit module control circuitry connected to said microprocessor via said channel service unit data link and coupled to said T1 transceiver and said second DSX-1 transceiver for controlling operation of said T1 transceiver and said second DSX-1 transceiver by means of said PBX control processor via said microprocessor.

14. An integrated channel service unit for interfacing a digital PBX to a digital DS1 transmission facility, said integrated channel service unit comprising:

a port circuit comprising:
  a switch fabric interface circuit connectable to the switch fabric of a digital PBX system;
  a first DSX-1 transceiver circuit defining a first DSX-1 communications port;
  a framer circuit connected between said switch fabric interface circuit and said DSX-1 transceiver circuit for transcoding framing therebetween;
  a microprocessor for controlling said switch fabric interface circuit, said DSX-1 transceiver circuit and said framer circuit to transmit properly framed data from said PBX switch fabric to said first DSX-1 communications port and to transmit properly framed data from said first DSX-1 communications port to said PBX switch fabric via said switch fabric interface circuit, said DSX-1 transceiver circuit and said framer circuit;
  a system control interface for coupling said microprocessor to a control processor of said digital PBX for control of said microprocessor via said PBX control processor; and
  a channel service unit data link coupled to said microprocessor; and a channel service unit module comprising:
  a T1 transceiver;
  line interface circuitry for coupling said T1 transceiver to said DS1 transmission facility, said line interface circuitry comprising a transmitter transformer having a center-tapped secondary winding extending toward said DS1 transmission line, a receiver transformer having a center-tapped primary winding extending toward said DS1 transmission line, and wiring test circuitry for detecting discontinuities in wiring extending from said line interface circuitry toward said DS1 transmission line, said wiring test circuitry comprising a current limited current source and at least one switch for selectively connecting said current limited current source between said center tap of said transmitter transformer and said center tap of said receiver transformer;
  a second DSX-1 transceiver circuit defining a second DSX-1 communications port for connecting said T1 transceiver to said framer circuit through said first DSX-1 port; and
  channel service unit module control circuitry connected to said microprocessor via said channel service unit data link and coupled to said T1 transceiver and said second DSX-1 transceiver for controlling operation of said T1 transceiver and said second DSX-1 transceiver.

* * * * *